(12) United States Patent
Rojanski et al.

(10) Patent No.: US 11,276,944 B2
(45) Date of Patent: Mar. 15, 2022

(54) RADAR SYSTEM AND METHOD FOR DETERMINING DIRECTION TO AN OBJECT

(71) Applicant: ISRAEL AEROSPACE INDUSTRIES LTD., Lod (IL)

(72) Inventors: Vladimir Rojanski, Petach Tikva (IL); Liran Wiener, Hod Hasharon (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 67 days.

(21) Appl. No.: 16/959,824

(22) PCT Filed: Jan. 16, 2019

(86) PCT No.: PCT/IL2019/050062
§ 371 (c)(1),
(2) Date: Jul. 2, 2020

(87) PCT Pub. No.: WO2019/155456
PCT Pub. Date: Aug. 15, 2019

(65) Prior Publication Data
US 2020/0373681 A1    Nov. 26, 2020

(30) Foreign Application Priority Data
Feb. 12, 2018 (IL) ............................... 257479

(51) Int. Cl.
*H01Q 21/00* (2006.01)
*H01Q 21/24* (2006.01)
(Continued)

(52) U.S. Cl.
CPC ............. *H01Q 21/245* (2013.01); *G01S 3/46* (2013.01); *H01Q 1/246* (2013.01); *H04B 7/10* (2013.01)

(58) Field of Classification Search
CPC .. G01S 3/043; G01S 3/04; G01S 3/46; H01Q 1/24; H01Q 1/246; H01Q 21/00; H01Q 21/24; H01Q 21/245; H04B 7/10
See application file for complete search history.

(56) References Cited

U.S. PATENT DOCUMENTS 3,001,193 A * 9/1961 Marie ..................... G01S 7/026
                                                342/365
3,215,368 A   11/1965 Follin et al.
(Continued)

FOREIGN PATENT DOCUMENTS

| CN | 106848546 A | 6/2017 |
| CN | 106970361 A | 7/2017 |
| WO | 2017141232 A1 | 8/2017 |

OTHER PUBLICATIONS

Extended European Search Report issued in European Application No. 19750733.8, dated Oct. 21, 2021, 5 pages.

*Primary Examiner* — Tho G Phan
(74) *Attorney, Agent, or Firm* — Dorsey & Whitney, LLP

(57) ABSTRACT

A system and method for determination of a direction to an object emitting and/or reflecting electromagnetic radiation. The system includes a first pair of linearly polarized antennas configured for receiving a polarized signal of a first polarization type and a second pair of linearly polarized antennas configured for receiving another polarized signal of the polarization second type originated from the object. The system includes four receivers coupled to the linearly polarized antennas of the first and second pairs and a signal processing system coupled to the receivers. Each receiver associated with at least one pair of the antennas, includes a phase shifter to provide a required phase shift to the received polarized signals. The signal processing system combines the phase-shifted polarized signals with non-shifted signals which are originated from different pairs of the antennas, and to process these signals for generating at least one direction parameter of the object.

20 Claims, 14 Drawing Sheets

(51) Int. Cl.
    *G01S 3/46*          (2006.01)
    *H01Q 1/24*         (2006.01)
    *H04B 7/10*         (2017.01)

(56) References Cited

U.S. PATENT DOCUMENTS

| | | | |
|---|---|---|---|
| 3,523,659 A * | 8/1970 | Epperson, Jr. | F41G 7/222 |
| | | | 244/3.17 |
| 3,935,575 A | 1/1976 | Leisterer et al. | |
| 4,328,499 A | 5/1982 | Anderson et al. | |
| 5,093,649 A * | 3/1992 | Johnson | G01S 13/87 |
| | | | 342/157 |
| 5,543,809 A * | 8/1996 | Profera, Jr. | H01Q 3/46 |
| | | | 343/753 |
| 6,127,974 A | 10/2000 | Kesler | |
| 6,252,559 B1 | 6/2001 | Donn | |
| 6,985,123 B2 * | 1/2006 | Gotti | H01Q 21/24 |
| | | | 343/853 |
| 7,990,329 B2 * | 8/2011 | Deng | H01Q 1/246 |
| | | | 343/757 |
| 10,069,214 B1 * | 9/2018 | Hooper | H01Q 21/24 |
| 2004/0160364 A1 | 8/2004 | Regev | |
| 2005/0184192 A1 | 8/2005 | Schneider | |
| 2013/0314289 A1 | 11/2013 | Hoferer et al. | |

\* cited by examiner

RADAR SYSTEM AND METHOD FOR DETERMINING DIRECTION TO AN OBJECT

TECHNOLOGICAL FIELD

The present invention relates generally to direction finding, and in particular, to radar systems for determination of an elevation angle and an azimuth angle of an object emitting and/or reflecting electromagnetic radiation.

BACKGROUND

Radar is an object detection system that uses electromagnetic waves to detect and locate distant objects. By measuring the time between the transmission of a wave and the return of its reflection, the radar system determines the distance and direction to the target.

In the past, radars were used to transmit and receive radio waves having only a single polarization. As a consequence, a target which can reflect only a singly polarized beam perpendicular to the incident polarized beam, has the potential of being invisible, even if a target has a strong reflection coefficient.

Polarimetric systems (also referred to as "dual polarization systems") have been used primarily because of their properties regarding signal to clutter enhancement or improved target classification and identification. Polarimetric radars transmit and receive both horizontal and vertical polarizations. Beams having horizontal polarization provide essential information on horizontal "properties" of the target, whereas vertically polarized beams provide essential information on vertical "properties" of the target. Since the power returned from the radar is a complicated function of the target size, shape, orientation, density, reflectivity, etc., the additional information received from the second type of polarization can provide improved target detection.

A monopulse radar technique and/or a radar interferometric technique can, for example, be used to gather angle information on a target, in particular, when used in a tracking radar.

The basic monopulse radar system uses four antennas, or four quadrants of a single antenna that are controlled together. The target is illuminated by all four quadrants, and a comparator network is used to produce four return signals. These return signals include a "sum" signal ($\Sigma$) that is a combination of the received signal from all four quadrants, an elevation angle difference signal ($\Delta_E$) that is formed by subtracting the signal from the two upper quadrants from the signal from the two lower quadrants, and an azimuth angle difference signal ($\Delta_A$) formed by subtracting the signals from the left quadrants from the signals from right quadrants. In a tracking radar, the sum signal is used to track the target's distance from the monopulse radar system and the azimuth difference signal is used to determine the target's position to the left or right of the radar system. The elevation difference signal may be used to determine the target's position relative to the horizon.

A radar phase interferometer is a receiving system that determines the angle of arrival of a wave by a phase comparison of the signals received at separate antennas or separate points on the same antenna. In the simplest form, polarimetric phase interferometer techniques utilize a pair of antennas for a horizontal polarization and another pair of antenna for a vertical polarization. The pairs of antennas can, for example be disposed on a moving platform and be spaced apart by a known distance such that a plane wave arriving at an angle relative to each pair is received by one antenna of the pair at an earlier point in time than the other, due to the difference in path length traversed by the wave. A typical radio frequency (RF) interferometer system computes a direction to a signal-emitting target (i.e., angular information on the target) by utilizing the phase difference or phase relation of the signals arriving at the individual antennas of the pair.

For example, U.S. Pat. No. 4,328,499 describes a radio direction finding system in which the angle of arrival of radio signals incident on a group of antenna elements is determined from the relative phase or phases of the radio signals incident upon two or more of said antenna elements. One of said elements is connected to a first radio receiver, while the other elements of the group are connected in turn to a second radio receiver, successive values of relative phase between signals received by the two receivers being utilized to derive a value for the angle of arrival of a radio signal relative to the antenna elements.

Generally, accuracy of radar systems increases with antenna separation. However, for interferometer radar systems increasing antenna separation leads to multiple results for calculation of angular information on the signal emitting object. The phase measurements of the interferometer become ambiguous when the baseline, that is the separation between the antennas in the pair, is greater than half the wavelength of the received signal. Thus, the desire of a long interferometer baseline, conflicts with the need for robust phase or ambiguity resolution, which is easier to accomplish with a short baseline. In addition, long baselines are difficult to implement when the antennas are mounted on an airborne platform.

GENERAL DESCRIPTION

Several problems are known to occur when a radar system is mounted on a vehicle platform for determination of a direction to an object emitting and/or reflecting electromagnetic radiation.

For certain vehicle platforms, such as missiles with wings or skimmers, there is only one dimension for integration of receiving antennas, since aerodynamics of the mechanical structure of the wings require it to be planar, rather than three-dimensional (3D). Thus, each antenna mounted on a planar surface of the wings is limited to a single polarization (e.g., vertical or horizontal), since fitting 3D multi-polarization elements (e.g., spiral antennas) on the planar surface of the wings is not feasible due to their impact on aerodynamics of the vehicle platform. This limits the design of an antenna mounted on the body or wings of a vehicle platform to a single polarization.

Moreover, when an interferometer technique is used for determination of a direction to a signal emitting object, the resolution of measurements is aggravated when the interferometer system located on a vehicle employs several receiving antennas designed for measuring signals having wavelengths similar to the vehicle's dimensions, since the baseline values between the antennas are limited by the geometrical dimensions of the vehicle.

For reception of signals of any polarization and determination of spatial angles to the object for both axes (azimuth and elevation), the required number of antennas is at least four. Thus, when it is not practical to assemble the four antennas inside the body on the required distance between them, it would be desired to fit the antennas outside the body of the vehicle.

There is also a need, and it would be advantageous, to have a radar system mounted on a vehicle platform, in which the ambiguity associated with the discrimination process of the interferometer techniques is resolved, and the system would solve the problem of ambiguity for any polarization.

The present invention partially eliminates the deficiencies of prior art radar systems without deterioration of performance of the antennas, and provides a novel radar system for determination of a direction to an object emitting and/or reflecting electromagnetic radiation. The direction to a signal emitting object can, for example, be defined by an object elevation angle and an object azimuth angle.

Examples of the sources emitting electromagnetic radiation include, but are not limited to, commercial radio and television stations, cell telephone towers, sources from space-borne platforms, etc.

According to an embodiment of the present invention, the radar system includes a transmitter for illuminating a target object with electromagnetic radiation. The electromagnetic signals reflected from the illuminated object can then be detected and processed for determination of a direction to the object.

According to an embodiment of the present invention, the system for determination of a direction to an object includes a first pair of linearly polarized antennas having a first type of polarization and a second pair of linearly polarized antennas having a second type of polarization, orthogonal to the polarization of the first pair. The first pair of linearly polarized antennas is separated by a first predetermined distance defining a first baseline. The first pair of linearly polarized antennas is configured for receiving a polarized signal of the first type of polarization which originated from the object emitting and/or reflecting electromagnetic radiation. The second pair of linearly polarized antennas is separated by a second predetermined distance defining a second baseline. The second pair of linearly polarized antennas is configured for receiving another polarized signal of the second type of polarization which originated from the object.

According to an embodiment of the present invention, the first baseline and the second baseline intersect at right angles to define four quadrant parts.

According to an embodiment of the present invention, the system includes four receivers coupled to the linearly polarized antennas of the first and second pairs. The receivers are configured for detecting electromagnetic radiation emitted by and/or reflected from an object. Each receiver associated with at least one pair of the antennas includes a phase shifter configured to receive polarized signals, to provide required phase shifts to the received polarized signal, and to generate corresponding phase-shifted polarized signals.

According to an embodiment of the present invention, the system further includes a signal processing system coupled to the four receivers. The signal processing system is configured for combining the phase-shifted polarized signals which are originated from the pair of the antennas associated with the corresponding phase shifters, with non-shifted signals which are originated from another pair of the antennas.

As a result of combining the shifted and non-shifted signals, four virtual antennas are formed, which have a desired polarization with phase centers located in said four quadrant parts, correspondingly. The desired polarization of the virtual antennas is characterized by an effective multiple type of polarization over the entire bandwidth around the required wavelength.

In the receiving mode, each two opposing sets of the virtual antennas can determine the angular orientation of the received signal, in two orthogonal axes, thereby allowing full spatial coverage. Accordingly, the signal processing system processes the signals having the desired polarization associated with these four virtual antennas and generates at least one direction parameter of the object.

According to another embodiment of the present invention, the first type of polarization and the second type of polarization are two perpendicular linear polarizations. For example, the first type of polarization and the second type of polarization can be selected from a horizontal linear polarization and a vertical linear polarization, correspondingly.

According to an embodiment of the present invention, the required phase shift to the received polarized signals is 90°. In this case, the desired polarization of the virtual antennas is a circular polarization. It should be understood that when desired to have other polarization than circular, the required phase shift and amplitudes to the received polarized signals can be selected as required, mutatis mutandis.

According to an embodiment of the present invention, each receiver includes an amplifier/attenuator configured for tuning power of the polarized signals received on apertures of at least one pair of the linearly polarized antennas.

The combination and processing of the received signals, and the determination of the angular orientation, can be done in both completely analog (in the original radio frequency) and digital (using sampling and processing) methods.

Thus, when the signal processing system is configured for digital signal processing of the signals having the desired polarization, the system includes four analog-to-digital converters arranged upstream to the signal processing system.

According to an embodiment of the present invention, the radar system further includes four transmitters coupled to the linearly polarized antennas of the first and second pairs. Each transmitter includes a source of radio frequency radiation and a phase shifter configured to provide required phase shifts to the signals provided by the source of radio frequency radiation to generate corresponding phase-shifted signals for transmitting towards a target object. Moreover, each transmitter can include an amplifier/attenuator configured for tuning power of the polarized signals transmitted on apertures of the linearly polarized antennas of the first and second pairs. It should be understood that by providing a suitable phase shift and amplitude to the signals transmitted on apertures of the linearly polarized antennas, the entire transmitted signal produced by the radar system from the four linearly polarized antennas can have any desired polarization and power.

The radar system of the present invention has many of the advantages of prior art techniques, while simultaneously overcoming some of the disadvantages normally associated therewith.

The radar system according to the present invention may be adapted for certain applications, in which size and cost are critical, such as airborne and/or space radar systems.

The radar system according to the present invention allows utilization and integration of planar antennas into planar wings or onto the body of the vehicle platform.

The radar system according to the present invention may be easily and efficiently manufactured.

The radar system according to the present invention is of durable and reliable construction.

The radar system according to the present invention may have a relatively low manufacturing cost.

According to another general aspect of the present invention, there is provided a method for determination of a direction to an object emitting and/or reflecting electromagnetic radiation. The method first includes providing a radar system generally described hereinabove. Specifically, the step of providing of the radar system includes providing a first pair of linearly polarized antennas having a first type of polarization, and a second pair of linearly polarized antennas having a second type of polarization orthogonal to the polarization of the first pair. For example, the two types of polarization can be selected from a horizontal polarization and a vertical polarization.

The linearly polarized antennas of the first pair are separated by a first predetermined distance defining a first baseline. The second pair of linearly polarized antennas is separated by a second predetermined distance defining a second baseline. The first baseline and the second baseline intersect at right angles to define four quadrant parts.

The step of providing of the radar system also includes providing four receivers coupled to the linearly polarized antennas of the first and second pairs. Each receiver that is associated with at least one pair of the antennas includes a phase shifter configured to receive polarized signals, to provide a required phase shift to the received polarized signals, and to generate corresponding phase-shifted polarized signals.

According to an embodiment of the present invention, the method for determination of the direction to the object includes receiving a polarized signal which originated from the object by said first pair of the linearly polarized antennas, and receiving another polarized signal which originated from the object by the second pair of the linearly polarized antennas.

The method also includes providing required phase shifts to the received polarized signal which originated from one or two pairs of the antennas selected from the first and second pairs, and generating corresponding phase-shifted polarized signals. Further, the phase-shifted polarized signals which originated from one pair of the antennas are combined with non-shifted signals (or with signals having different shifts) which originated from another pair of the antennas, thereby forming four virtual antennas having a desired polarization with phase centers located in the four quadrant parts, correspondingly.

Then, the signals having the desired polarization associated with the four virtual antennas are processed to generate at least one direction parameter of the object.

According to an embodiment of the present invention, the processing of the signals having the desired polarization for generating at least one direction parameter of the object includes applying a monopulse tracking technique. Specifically, the monopulse tracking technique includes summing signals received from the four virtual antennas formed in said four quadrant parts to calculate a four antennas sum signal ($\Sigma$). The applying of the monopulse tracking technique also includes summing received signals associated with any two neighboring virtual antennas selected from the four virtual antennas to calculate a first two antennas sum signal and summing received signals associated with two other neighboring virtual antennas to calculate a second two antennas sum signal. Further, a difference signal ($\Delta$) between the first two antennas sum signal and the second two antennas sum signal is generated. Then, the four antennas sum signal ($\Sigma$) and the difference signal ($\Delta$) are processed for generating one or more direction parameters of the object.

According to another embodiment of the present invention, the processing of the signals having the desired polarization for generating at least one direction parameter of the object includes applying an interferometry technique. Specifically, the interferometry technique includes generating a phase difference signal between the received signals associated with a pair of virtual antennas formed in two quadrant parts selected from said four quadrants. The two quadrant parts are oppositely located with respect to an intersection point of the first baseline and the second baseline. Further, a distance between phase centers of the virtual antennas formed in these two quadrant parts is calculated. The interferometry technique also includes processing the phase difference signal and the distance between the phase centers for generating one or more parameters of the object.

According to an embodiment of the present invention, the method for determination of the direction to the object includes tuning of the power (i.e., amplitudes) of the polarized signals received on apertures of at least one pair of the linearly polarized antennas, thereby varying location of the phase centers of the virtual antennas within the space of said four quadrant parts.

According to an embodiment of the present invention, the method for determination of the direction to the object includes varying phases of the polarized signals received by at least one pair of the linearly polarized antenna to provide required phase shifts to the received polarized signals. For example, the required phase shift to the received polarized signals can be 90°. In this case, the polarization of the virtual antennas is a circular polarization.

According to an embodiment of the present invention, the method for determination of the direction to the object includes providing four transmitters coupled to the linearly polarized antennas of the first and second pairs. The four transmitters form four transmitting channels.

The method includes generating corresponding phase-shifted signals in each transmitting channel, and transmitting polarized signals by the linearly polarized antennas of the first and second pairs toward a target object for illuminating thereof.

According to an embodiment, the method can include amplification/attenuation of the phase-shifted signals for tuning power of the polarized signals transmitted by the linearly polarized antennas.

It should be understood that by providing a suitable phase shift and amplitude to the signals transmitted on apertures of the linearly polarized antennas, the entire transmitted signal produced by the radar system from the four linearly polarized antennas can have any desired polarization and power.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
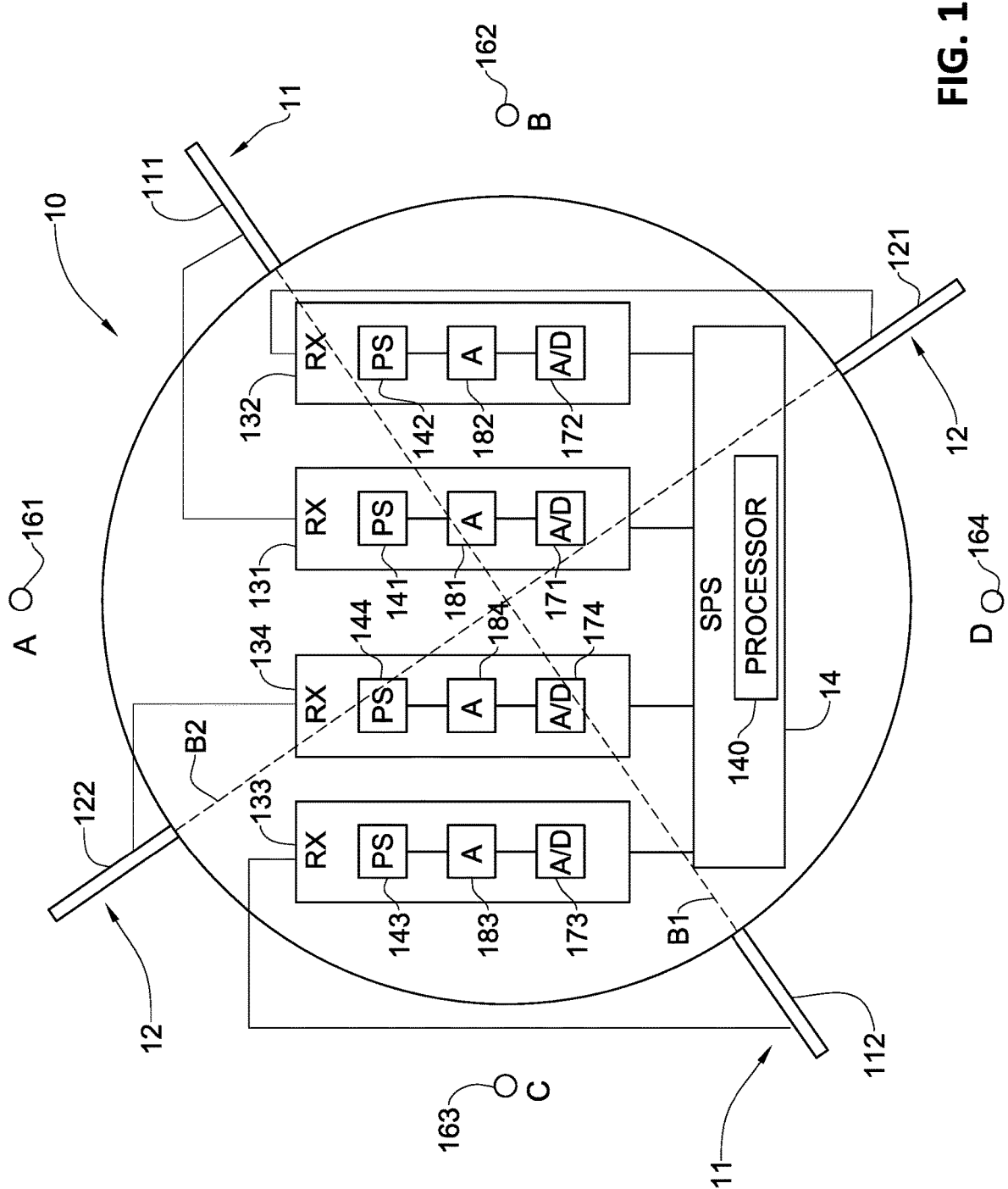
FIG. 1 illustrates a radar system for determination of a direction to an object, according to an embodiment of the present invention.

The principles of the radar system for determination of a direction to an object emitting and/or reflecting electromagnetic radiation, according to the present invention, may be better understood with reference to the drawings and the accompanying description, wherein like reference numerals have been used throughout to designate identical elements. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

It should be noted that the blocks as well as other elements in these figures are intended as functional entities only, such that the functional relationships between the entities are shown, rather than any physical connections and/or physical relationships. Those versed in the art should appreciate that many of the examples provided have suitable alternatives which may be utilized.

Referring to FIG. 1, a radar system 10 for determination of a direction to a signal emitting object (not shown) is illustrated, according to an embodiment of the present invention. Parameters defining the direction to an object include, but are not limited to, an object elevation angle and an object azimuth angle. It should be noted that the terms "elevation angle" and "azimuth angle" are two direction parameters defining a direction relative to a platform from which the direction to the signal emitting object is determined. The signal emitting object may, for example, be a radio frequency (RF) transmitter arranged on an airborne vehicle or on a stationary object.

According to an embodiment of the present invention, the system 10 for determination of a direction to a signal emitting object (not shown) includes a first pair of linearly polarized antennas 111 and 112 having a first type of polarization and a second pair 12 of linearly polarized antennas 121 and 122 having a second type of polarization that is orthogonal to the polarization of the first pair 11.

The linearly polarized antennas 111 and 112 of the first pair 11 are configured for receiving a polarized signal of the first type of polarization which originated from the signal emitting object. The linearly polarized antennas 121 and 122 of the second pair 12 are configured for receiving another polarized signal which originated from the signal emitting object that has the second type of polarization. The first type of polarization and the second type of polarization can be two perpendicular linear polarizations (e.g., horizontal and vertical polarizations, correspondingly).

The linearly polarized antennas 111 and 112 of the first pair 11 are separated by a first predetermined distance defining a first baseline $B_1$. The linearly polarized antennas 121 and 122 of the second pair 12 are separated by a second predetermined distance defining a second baseline $B_2$. The first baseline $B_1$ and the second baseline $B_2$ intersect at right angles to define four quadrant parts A, B, C and D.

According to an embodiment of the present invention, the system 10 also includes four receivers (Rx) 131, 132, 133 and 134. The receivers 131 and 133 are coupled to the linearly polarized antennas 111 and 112 of the first pair 11, while the receivers 132 and 134 are coupled to the linearly polarized antennas 121 and 122 of the second pair 12, correspondingly.

According to an embodiment of the invention, at least one pair or both pairs of the receivers (the receivers 131 and 133 and/or the receivers 132 and 134) include phase shifters.

Thus, the receivers 131 and 133, associated with the first pair 11 of the antennas 111 and 112, can include phase shifters 141 and 143, correspondingly. The phase shifters 141 and 143 are configured to receive polarized signals, to provide required phase shifts to the received polarized signal, and to generate corresponding phase-shifted polarized signals.

Likewise, the receivers 132 and 134, associated with the second pair 12 of the antennas 121 and 122, can include phase shifters 142 and 144, correspondingly. The phase shifters 142 and 144 are configured to receive polarized signals, to provide required phase shifts to the received polarized signal, and to generate corresponding phase-shifted polarized signals.

The receivers 131, 132, 133 and 134 form four receiving channels. Each receiver 131, 132, 133 or 134 may include a receiver amplifier/attenuator 181, 182, 183 or 184, correspondingly, and other conventional elements arranged in the receiving channels and utilized in radar systems. In particular, when the received signals are processed in a digital manner, each receiver channel may also include a corresponding analog-to-digital converter (ADC) 171, 172, 173 or 174.

Although in the embodiment shown in FIG. 1, the amplifier/attenuators 181, 182, 183 and 184 are arranged downstream of the phase shifters 141, 142, 143 and 144, correspondingly, when desired the amplifier/attenuators can be arranged upstream of the phase shifters.

According to an embodiment of the present invention, the system 10 further includes a signal processing system (SPS) 14 arranged downstream of the four receivers 131, 132, 133 and 134. The signal processing system (SPS) 14 includes a discriminator/processor 140 coupled to the four receivers 131, 132, 133 and 134 via the ADCs 171, 172, 173, 174 and the amplifier/attenuators 181, 182, 183, 184.

The signal processing system 14 is configured, inter alia, for combining phase-shifted polarized signals having a first shift value, which are originated from the pair of the antennas coupled to the phase shifters with phase-shifted polarized signals having a second shift value which are originated from another pair of the antennas. As a result of such combining, four "virtual" antennas 161, 162, 163 and 164 are formed, which can have a desired polarization with phase centers located in the four quadrant parts A, B, C and D, correspondingly.

In particular, when only one pair of the receivers 131, 132, 133 and 134 (the receivers 131, 133 and/or the receivers 132, 134) include phase shifters, the signal processing system 14 can combine phase-shifted polarized signals (which are originated from the pair of the antennas coupled to the phase shifters) with non-shifted signals (which are originated from another pair of the antennas, which are not associated with the phase shifters).

According to an embodiment of the present invention, phase shifting and attenuation operations can be performed directly in the SPS 14. In this case, the four receivers 131, 132, 133 and 134 can be implemented without phase shifters and attenuators.

Figure 2A:
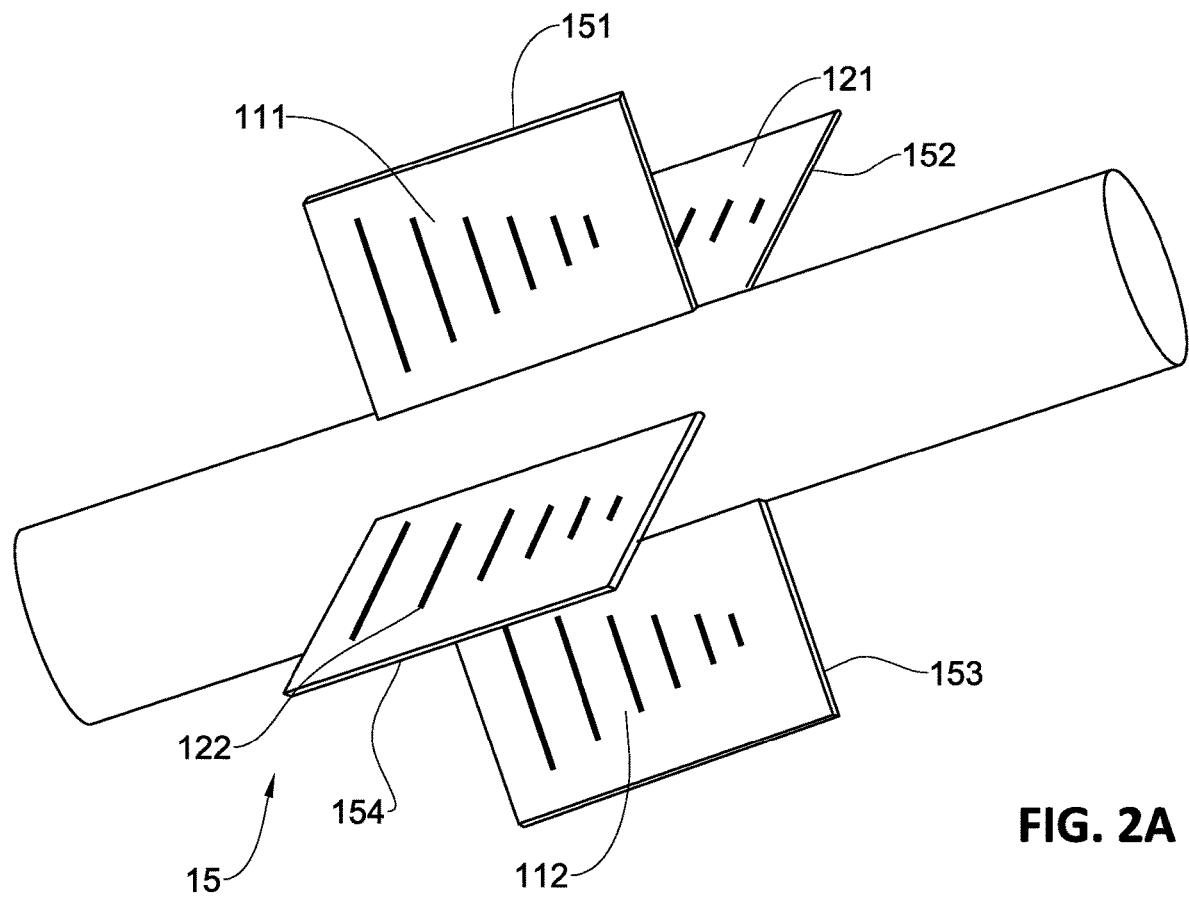
FIGS. 2A and 2B illustrate possible positions of the antennas of the radar systems shown in FIG. 1A with respect to a vehicle platform, according to two embodiments of the present invention.
Figure 2B:
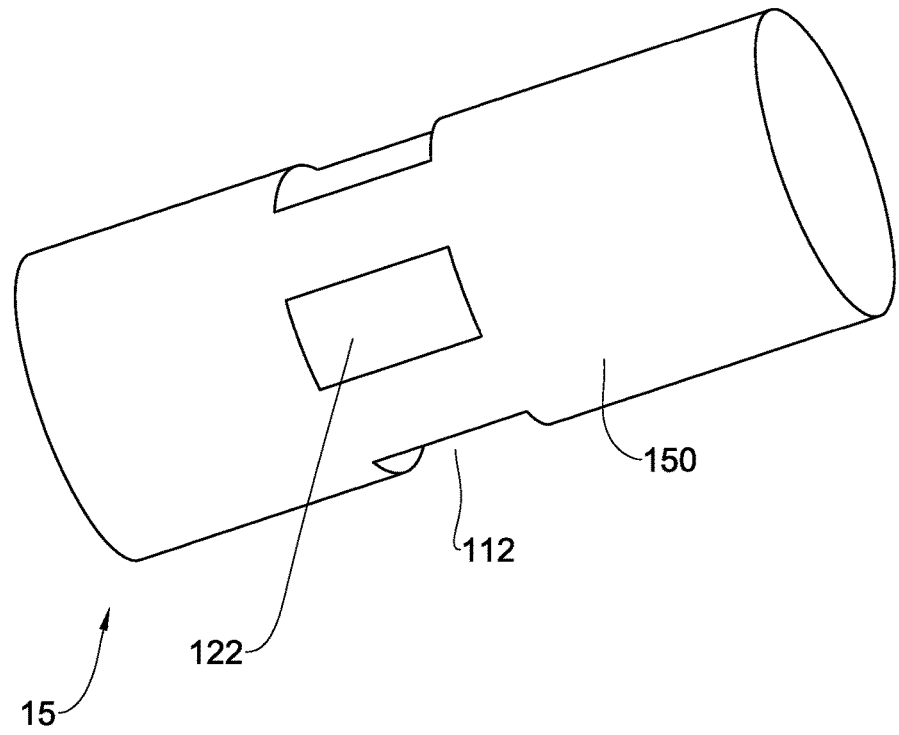

Referring to FIGS. 2A and 2B, possible positions of the antennas 111, 112, 121 and 122 with respect to a vehicle platform 15 are illustrated, according to two embodiments of the present invention. As shown in FIG. 2A, the linearly polarized antennas 111, 112, 121, 122 are mounted on planar wings 151, 152, 153, 154 of the vehicle platform 15. In turn, as shown in FIG. 2B, the linearly polarized antennas 111, 112, 121, 122 are mounted on/in the body 150 of the vehicle platform 15. The position of the antennas 111, 112, 121, 122 shown in FIGS. 2A and 2B do not affect aerodynamic properties of the vehicle platform 15.

It should be noted that the subject of this invention is not limited to any particular implementation of the linearly polarized antennas 111, 112, 121, 122. Hence, the antennas 111, 112, 121, 122 may be implemented in various alternatives. Examples of the antennas 111, 112, 121, 122 include, but are not limited to, patch antenna elements, log-periodic antenna, microstrip antenna elements, dipole antenna elements, tapered-Slot Antenna (TSA) elements (also known as Vivaldi) and other antenna elements or a combination thereof. Consequently, the type, shape and configuration of the antennas 111, 112, 121, 122 may be selected to be suitable for mounting on the vehicle platform.

The vehicle platform 15 can, for example, be a flying drone that homes on a RF transmitter, a smart bomb seeking an RF radiating target and/or a missile seeking an RF radiating target. In particular, the linearly polarized antennas 111 and 112 can be positioned in a common plane of the wings 151 and 153, whereas the linearly polarized antennas 121 and 122 can be positioned in a common plane of the wings 152 and 154 that is perpendicular to the plane of the antennas 110, correspondingly.

Turning back to FIG. 1, it should be noted that although the linearly polarized antennas 111, 112, 121, 122 are mounted on/in the body 150 or the wings 151, 152, 153, 154 of the vehicle platform 15, the virtual multi-polarization antennas 161, 162, 163 and 164 are formed in space in the four quadrant parts A, B, C and D, correspondingly. Due to the phase and amplitude tuning, which can be performed by the discriminator/processor 140, the virtual antennas 161, 162, 163 and 164 can virtually be created in different spatial locations of the four quadrant parts A, B, C and D relative to the physical positions of the original real antennas 111, 112, 121, 122.

Varying a location of the phase centers of the virtual antennas 161, 162, 163 and 164 within space of the four quadrant parts A, B, C and D can be achieved by using the amplifier/attenuators 181, 182, 183 and 184 configured for tuning the power of the signals received on apertures of at least one pair of the linearly polarized antennas 111, 112, 121 and 122, correspondingly.

The virtual antennas 161, 162, 163 and 164 can also have various desired polarizations by varying phases and amplitudes of the signals received by the antennas 111, 112 and/or antennas 121, 122. For example, a desired polarization of the virtual antennas 161, 162, 163 and 164 can be a circular polarization when a polarization of the antennas 111, 112 is the horizontal linear polarization and a polarization of the antennas 121, 122 is the vertical linear polarization, and the phase shifts provided by the phase shifters 141 and 143 to the signals received by the antennas 111, 112 is 90°, while the signals received by the antennas 121, 122 are non-shifted.

It should be understood that accuracy of the interferometric measurements utilizing the virtual antennas 161, 162, 163 and 164 can be greater than the accuracy of the measurements utilizing real antennas 111, 112, 121, 122 mounted on the wings or on the body of the vehicle, since a distance between the virtual antennas 161 and 163 formed in the quadrant parts A and D, as well as a distance between the virtual antennas 162 and 164 in the quadrant parts B and C, can be greater than the distance between the real antennas 111, 112 of the first pair 11 and the distance between the real antennas 121, 122 of the second pair 12. Moreover, since the virtual antennas 161, 162, 163 and 164 can be multi-polarization antennas (depending on the phase shifts provided by the corresponding phase shifters, and on amplitudes provided by the corresponding amplifier/attenuators), the interferometric measurements, based on the virtual antennas, are not bound to any specific polarization of the received signal.

Turning back to FIG. 1, the signal processing system 14 is also configured for processing signals having the desired polarization which are provided by the four virtual antennas 111, 112, 121, 122 to generate the direction parameters (e.g., elevation and azimuth angles) of the signal emitting object. As noted hereabove, the terms "elevation angle" and "azimuth angle are two direction parameters defining a direction relative to the vehicle platform on which the real antennas 111, 112, 121, 122 are mounted.

Several approaches for calculation of the direction parameters can be used.

According to an embodiment of the present invention, in order to track a signal emitting object (i.e., a target) with the radar system (10 in FIG. 1), use is made of the interferometry technique. According to an embodiment, the interferometry technique utilizes signals associated with a pair of the virtual antennas 161 formed in the quadrant A and the virtual antenna 164 formed in the quadrant D for determination of the elevation angle of the emitting object tracked by the radar system 10. In turn, signals associated with a pair of the virtual antenna 162 formed in the quadrant B and the virtual antenna 163 formed in the quadrant C are used for determination of the object azimuth angle.

For example, the virtual antennas 161, 162, 163 and 164 can be circular polarized. As described above, the circular polarization of the virtual antennas can be achieved by providing phase shifts of 90° to the received polarized signal which originated from the pair 11 of the linearly polarized antennas 111 and 112 or to the pair 12 of the linearly polarized antennas 121 and 122, and then combining the phase-shifted polarized signals with non-shifted signals.

For determination of the elevation angle θel of the object, the processing includes generating phase difference signal $\Delta\varphi_{AD}$ between the received signals associated with the pair of the virtual antennas 161 and 164 formed in quadrants A and D, correspondingly, and calculating distances $S_{AD}$ between the phase centers of the virtual antennas 161 and 164.

The azimuth angle θel can be obtained by $$\theta el = \sin^{-1}\left(\frac{\lambda \Delta\varphi_{AD}}{2\pi S_{AD}}\right) \quad (1)$$

For determination of the azimuth angle $\theta_{az}$ of the object, the processing includes generating phase difference signal $\Delta\varphi_{BC}$ between the received signals associated with the virtual antenna 162 formed in quadrant B and the virtual antenna 163 formed in quadrant C, and calculating distances $S_{BC}$ between the phase centers of the virtual antennas 162 and 163.

The elevation angle $\theta_{az}$ can be obtained by $$\theta az = \sin^{-1}\left(\frac{\lambda \Delta\varphi_{BC}}{2\pi S_{BC}}\right), \quad (2)$$

where λ is the wavelength of the received linearly polarized signals.

When required, in order to resolve ambiguity of polarization of the target, the signals received from two original real antennas can, for example, be used to discern the target's polarization.

Simulations were carried out for calculation of the dependencies between the phase difference signals $\Delta\varphi_{AD}$ and $\Delta\varphi_{BC}$ corresponding to polarizations of the received signals versus the elevation and azimuth angles of the signal emitting object, correspondingly, for different separations (baselines) between the real linearly polarized antennas 111, 112 and 121, 122 of the first pair and second pair. The boresight angle of 0 degree was selected for the calculations.

Figure 3A:
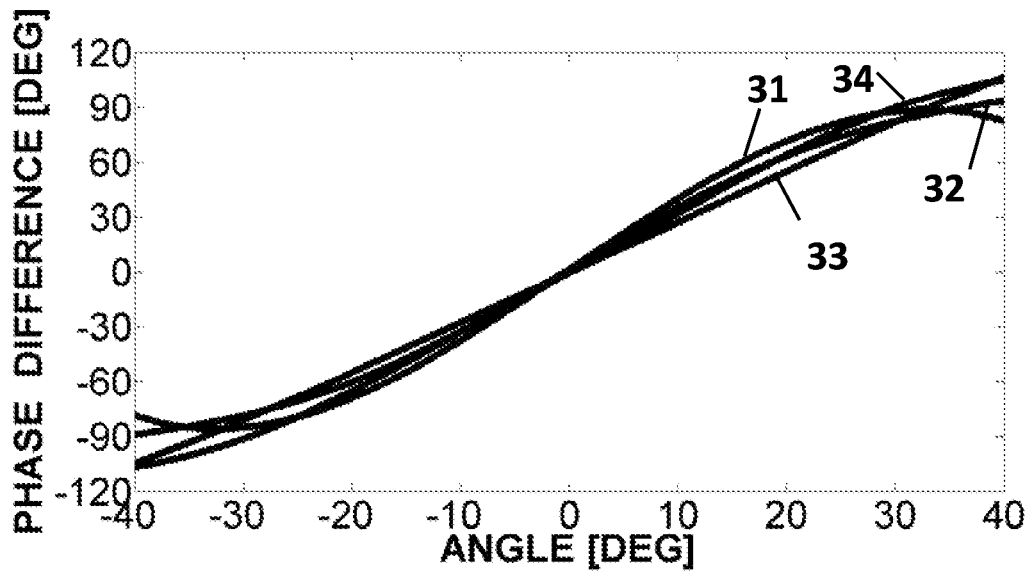
FIGS. 3A and 3B illustrate examples of the dependencies of phase difference signals versus an azimuth angle and an elevation angle, correspondingly, for the received signals having various linear polarizations, calculated for the separations between the antennas of λ/2, where λ is the wavelength of the received linearly polarized signals.
Figure 3B:
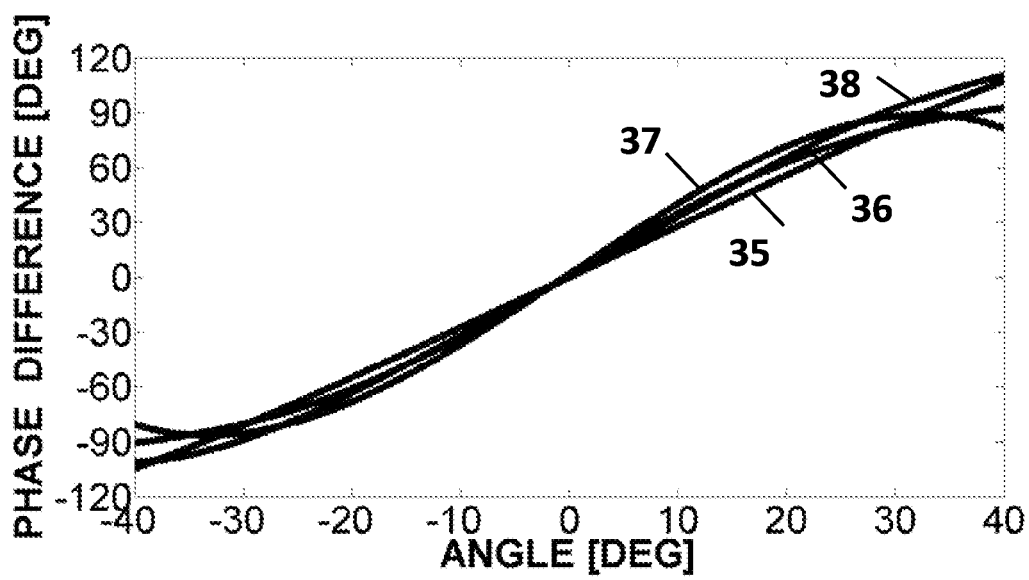

FIG. 3A illustrates examples of the dependencies of the phase difference signals $\Delta\varphi_{BC}$ versus the azimuth angle $\theta_{az}$ for the received signals having linear polarizations of 0 degree (curve 31), 45 degrees (curve 32), 90 degrees (curve 33) and 135 degrees (curve 34), correspondingly. FIG. 3B illustrates examples of the dependencies of the phase difference signals $\Delta\varphi_{AD}$ versus the elevation angle θel for the received signals having linear polarizations of 0 degree (curve 35), 45 degrees (curve 36), 90 degrees (curve 37) and 135 degrees (curve 38), correspondingly. The separations between the real linearly polarized antennas 111, 112 and 121, 122 of the first and second pairs was set to λ/2, where λ is the wavelength of the received linearly polarized signals. Thus, when polarization of the signal emitted by an object is known, the azimuth and elevation angles of the object can be accurately determined.

Figure 4A:
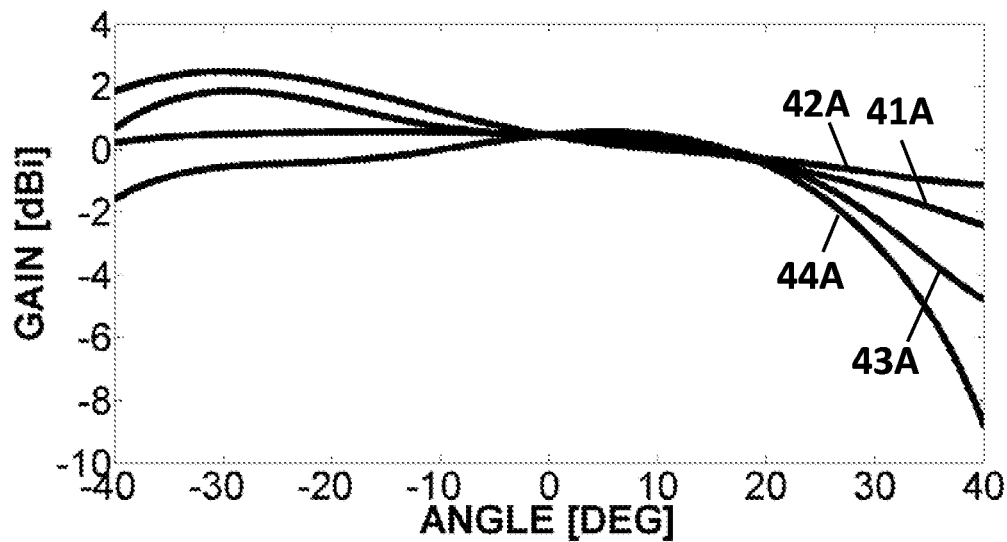
FIG. 4A and FIG. 4D illustrate examples of the dependencies of the signal amplitude versus elevation angle in elevation plane for virtual antennas formed in the upper and lower quadrants, correspondingly, of the radar systems of FIG. 1A, calculated for the separations between the antennas of λ/2.
Figure 4B:
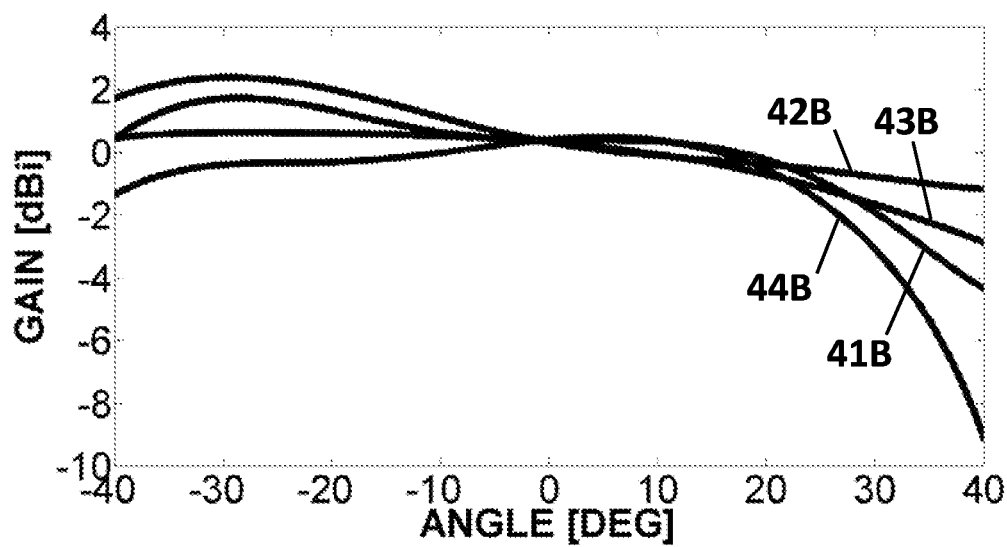
FIG. 4B and FIG. 4C illustrate examples of dependencies of the signal amplitude versus azimuth angle in an azimuth plate for the virtual antennas formed in the right and left quadrants, correspondingly, of the radar systems of FIG. 1A, calculated for the separations between the antennas of λ/2.
Figure 4C:
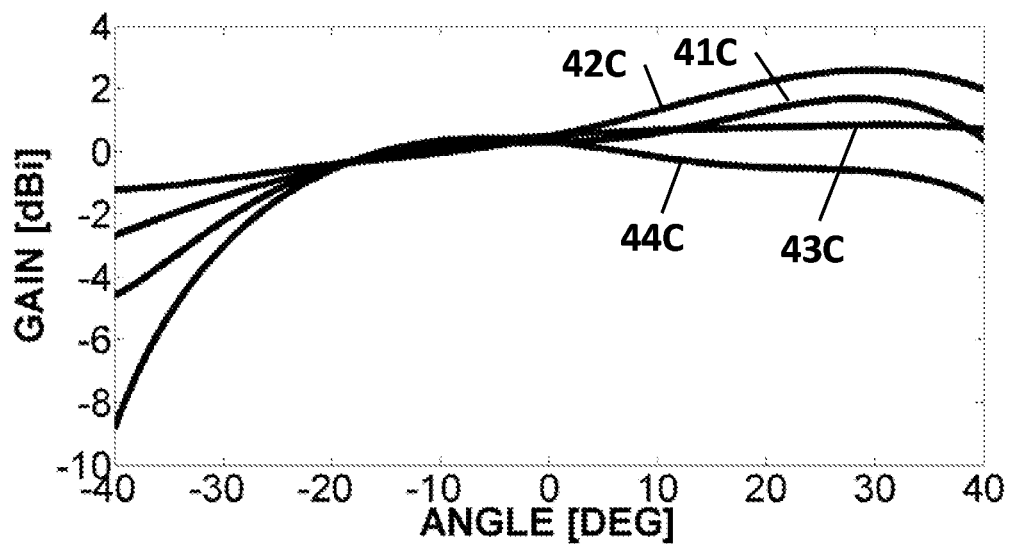
Figure 4D:
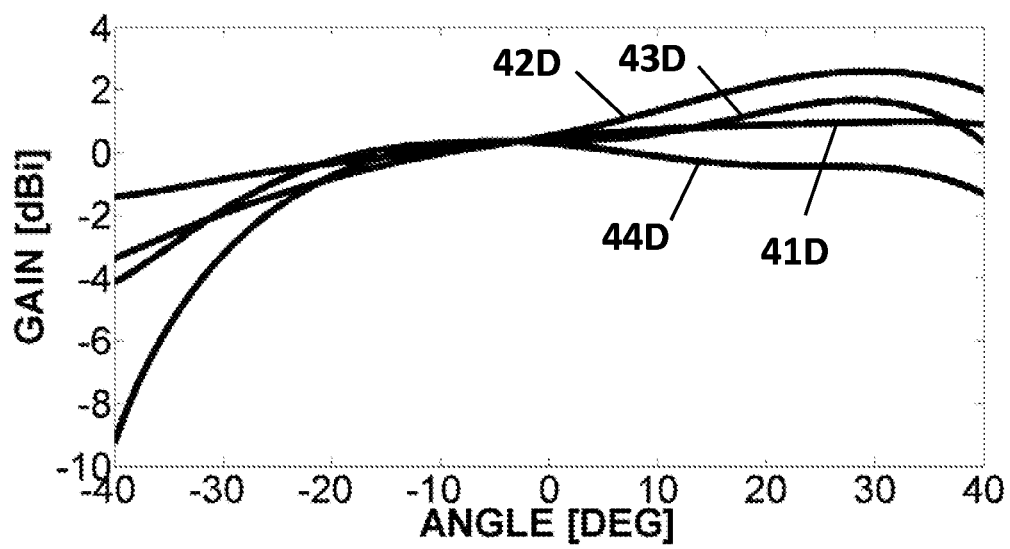

FIG. 4A and FIG. 4D illustrate examples of dependencies of the signal amplitude (i.e. antenna gain) versus elevation angle in an elevation plane for the virtual antennas 161 and 164 formed in quadrants A and D, correspondingly. In turn, FIG. 4B and FIG. 4C illustrate examples of dependencies of the signal amplitude (i.e. antenna gain) versus azimuth angle in an azimuth plate for the virtual antennas 162 and 163 formed in quadrants B, C correspondingly.

The examples shown in FIG. 4A through FIG. 4D are shown for separations between the antennas 111, 112 and 121, 122 of the first pair and second pair of λ/2. The dependencies are shown for the received signals having linear polarizations of 0 degree (curves 41A, 41B, 41C and 41D), 45 degrees (curve 41A, 41B, 41C and 41D), 90 degrees (curve 41A, 41B, 41C and 41D) and 135 degrees (curve 41A, 41B, 41C and 41D), correspondingly. As can be understood from the simulation results, the radar system of the present invention can operate well for determination of a direction to a signal emitting object. In particular, the amplitudes do not decrease less than −9 dB in the range of ±40 degrees in the elevation and azimuth planes.

Turning back to FIG. 1, the increase of the distances $B_1$ and B2 between the real linearly polarized antennas 111, 112 and 121, 122 of the first pair and second pair results in increase of distances $S_{AD}$ and $S_{BC}$ between the corresponding virtual antennas 161, 162, 163 and 164 formed in quadrants A, B, C and D. Accordingly, accuracy of determination of a radar system which uses both azimuth and elevation angles enhances when the distances between the real linearly polarized antennas 111, 112 and 121, 122 increase.

Figure 5A:
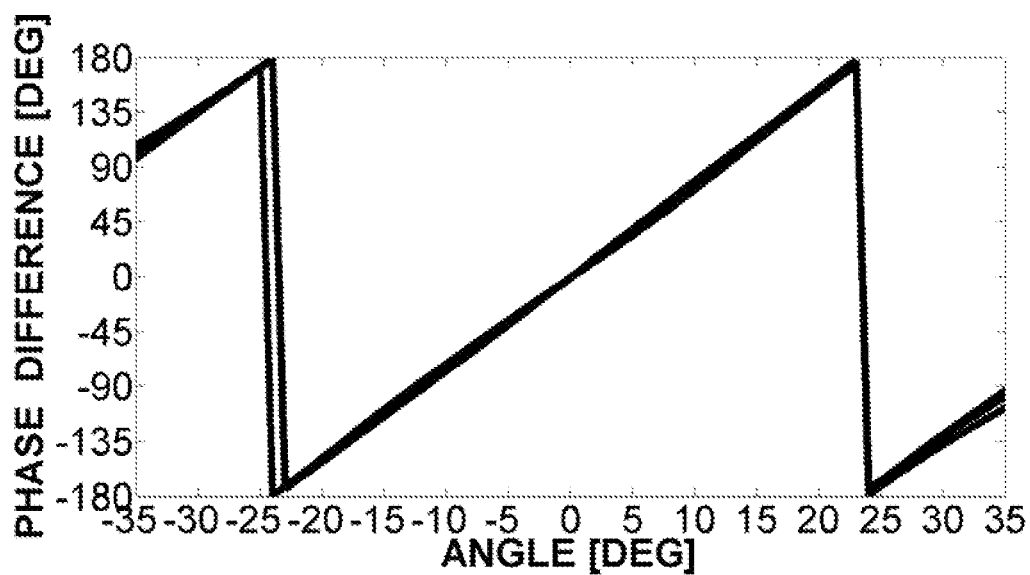
FIG. 5A and FIG. 5B illustrate examples of the dependencies of phase difference signals versus an azimuth angle and an elevation angle, correspondingly, for the received signals having various linear polarizations, calculated for the separations between the antennas of 1.25λ.
Figure 5B:
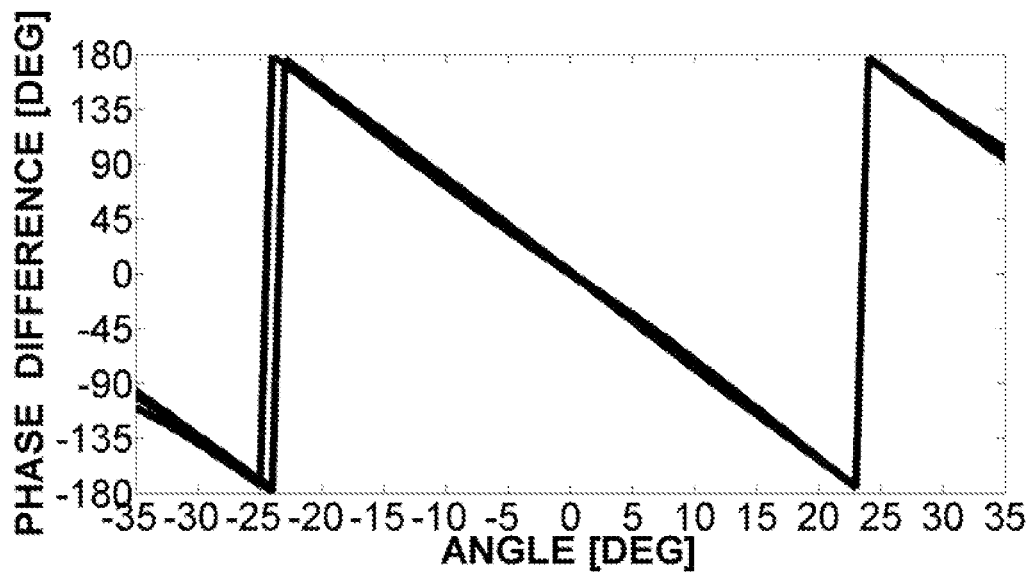

FIG. 5A illustrates examples of the dependencies of the phase difference signals $\Delta\varphi_{AD}$ versus the elevation angle θel for the received signals having linear polarizations of 0 degree, 45 degrees, 90 degrees and 135 degrees, when the separations between the real linearly polarized antennas 111, 112 and 121, 122 of the first pair and second pair was set to 1.25λ. In turn, FIG. 5B illustrates examples of the dependencies of the phase difference signals $\Delta\varphi_{BC}$ versus the azimuth angle $\theta_{az}$ for the received signals having linear polarizations of 0 degree, 45 degrees, 90 degrees and 135 degrees, when the separations between the real linearly polarized antennas 111, 112 and 121, 122 of the first pair and second pair was set to 1.25λ. As can be seen, polarization does not significantly affect the dependencies of the phase difference signals on the elevation and azimuth angles.

Figure 6A:
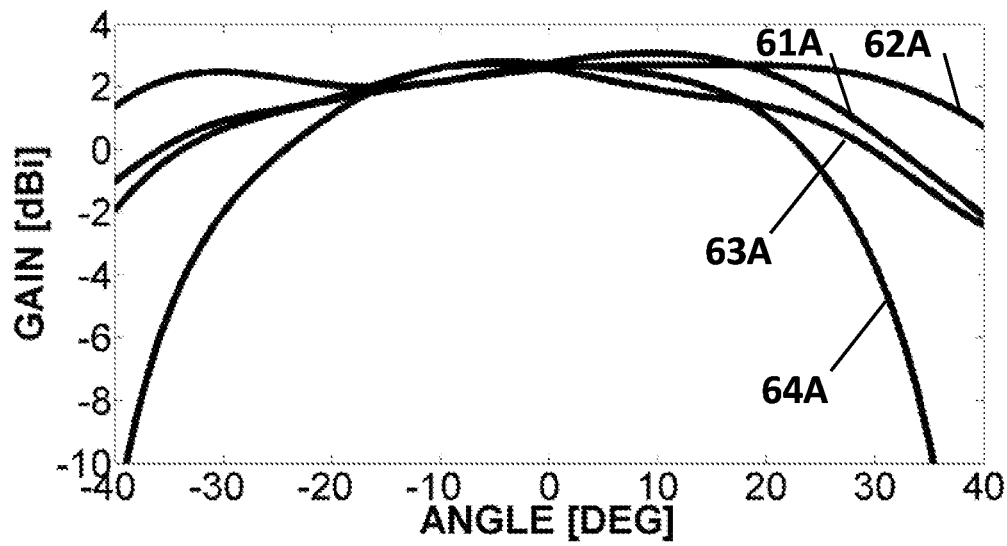
FIG. 6A and FIG. 6D illustrate examples of the dependencies of the signal amplitude versus elevation angle in elevation plane for virtual antennas formed in the upper and lower quadrants, correspondingly, of the radar systems of FIG. 1A, calculated for the separations between the antennas of 1.25λ.
Figure 6B:
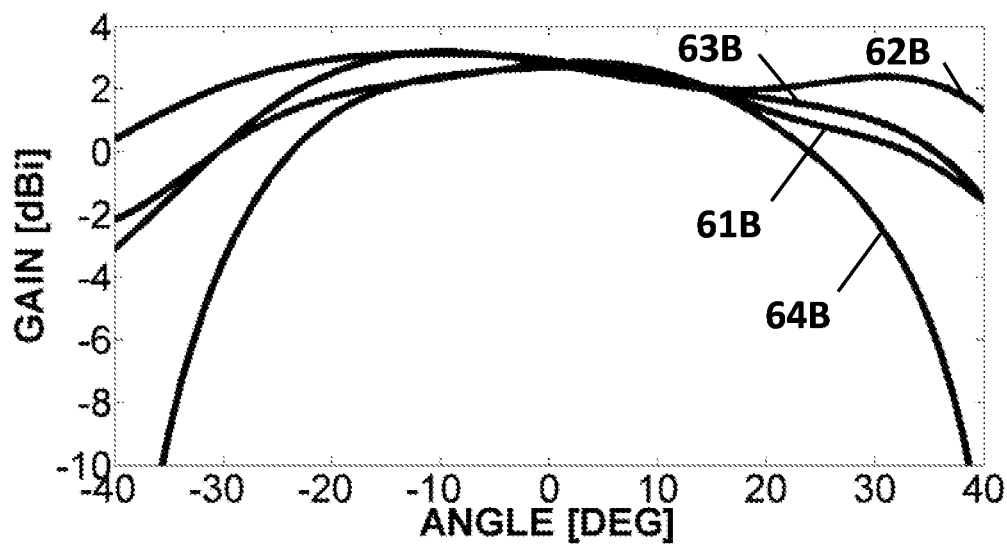
FIG. 6B and FIG. 6C illustrate examples of the dependencies of the signal amplitude versus azimuth angle in an azimuth plane for the virtual antennas formed in the right and left quadrants, correspondingly, of the radar systems of FIG. 1A, calculated for the separations between the antennas of 1.25λ.
Figure 6C:
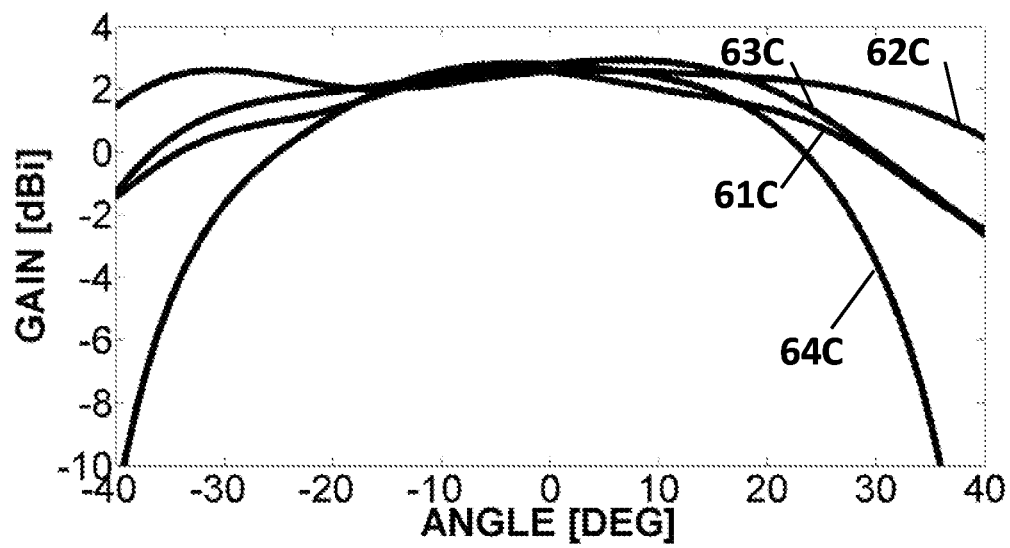
Figure 6D:
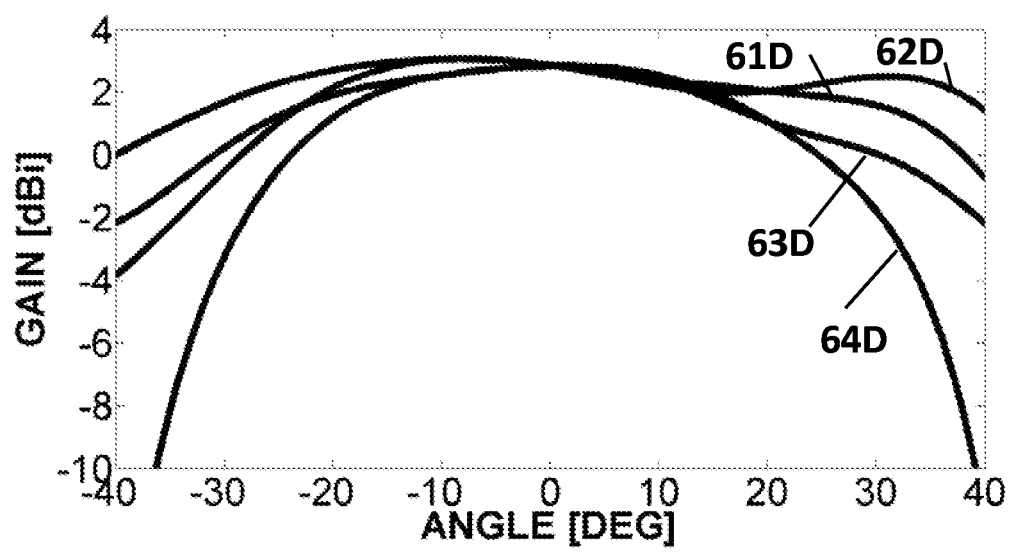

FIG. 6A and FIG. 6D illustrate examples of the dependencies of the signal amplitude versus elevation angle in an elevation plate for the virtual antennas 161, 162, 163 and 164 formed in quadrants A and D, correspondingly, In turn, FIG. 6B and FIG. 6C illustrate examples of the dependencies of the signal amplitude versus azimuth angle in an azimuth plate for the virtual antennas 161, 162, 163 and 164 formed in quadrants B and C, correspondingly. FIG. 6A through FIG. 6D illustrate examples for separations between antennas 111, 112 and 121, 122 of the first pair and second pair of 1.25λ.

Dependencies are shown for the received signals having linear polarizations of 0 degree (curves 61A, 61B, 61C and 61D), 45 degrees (curve 61A, 61B, 61C and 61D), 90 degrees (curve 61A, 61B, 61C and 61D) and 135 degrees (curve 61A, 61B, 61C and 61D), correspondingly. As can be understood from the simulation results, the radar system of the present invention can operate well for determination of a direction to a signal emitting object. In particular, the amplitudes for most of the polarizations do not decrease less than −10 dB in the range of ±35 degrees in the elevation and azimuth planes.

As can be seen, increasing antenna separation leads to multiple results for calculation of the azimuth and elevation angles. As can be seen in FIGS. 5A and 5B, ambiguities in this case begin occurring when, for example, the azimuth angle and the elevation angle exceed about 23 degrees. Such ambiguities can, for example, be resolved by adding an additional antenna.

Figure 7:
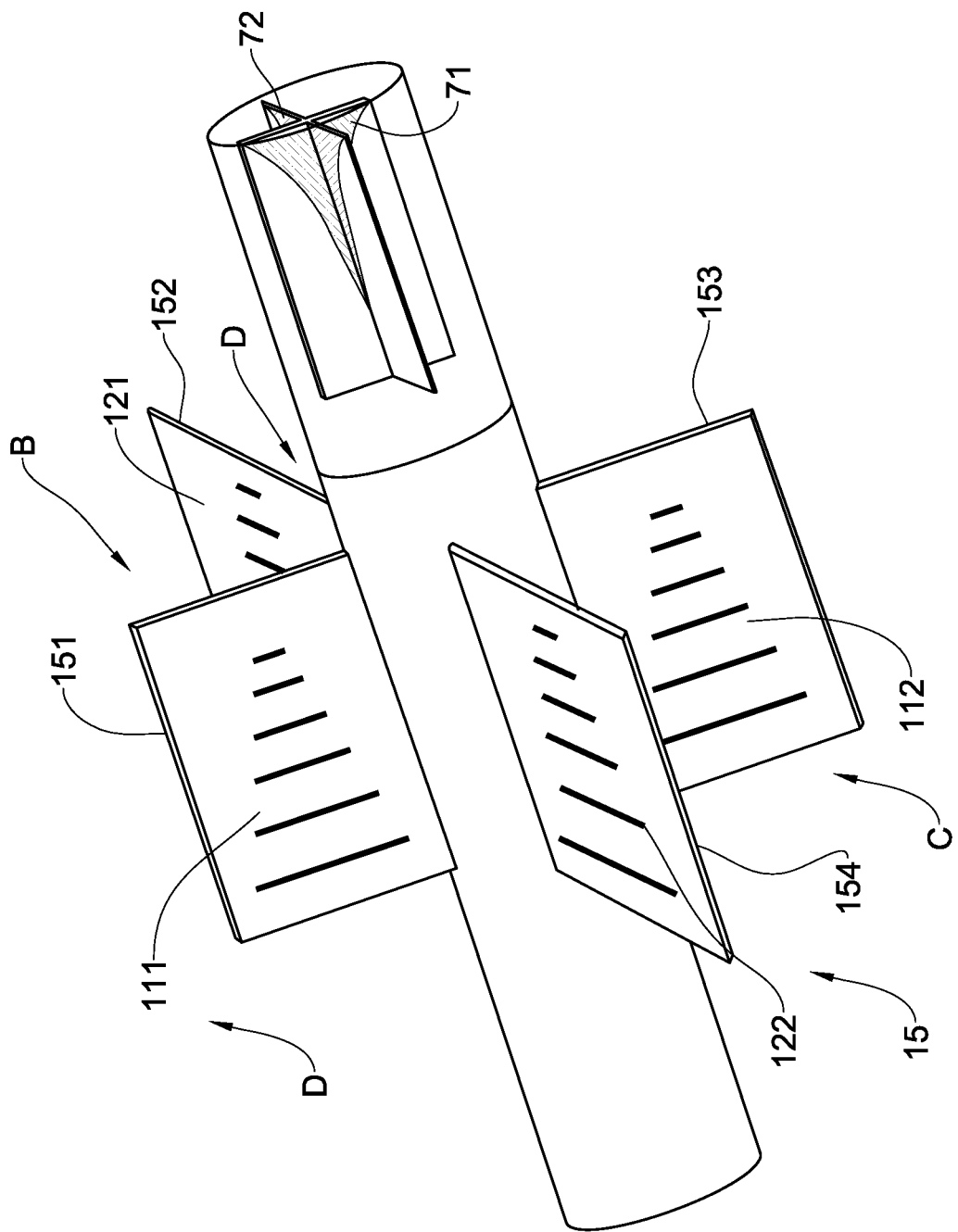
FIG. 7 illustrates a possible position of a fifth antenna placed on the vehicle platform in addition to the antennas mounted on the wings, in accordance with an embodiment of the present invention.

Referring to FIG. 7, a possible position of a fifth antenna 71 is shown, in accordance with an embodiment of the present invention. According to this embodiment, the fifth antenna 71 is placed on the vehicle platform 15 in addition to the antennas 111, 112 and 121, 122 mounted on the wings 151, 152, 153 and 154. The fifth antenna 71 is mounted within the body of the vehicle platform 15 near a longitudinal axis 72 of the vehicle platform 15. Since this fifth antenna 71 is not mounted on the planar wings, but rather in the body of the vehicle platform 15, aerodynamic restrictions are not applied to this antenna, and it does not need to be a planar linearly polarized antenna. Hence, the fifth antenna 71 can, for example, be a circular polarized antenna.

For resolving ambiguities associated with multiple results for calculation of the azimuth and elevation angles, phase differences can be calculated between the fifth antenna 71 and one or more virtual virtual antennas 161, 162, 163 and 164 formed in quadrants A, B, C and D. The calculated phase differences can be compared to determine ambiguous azimuth and elevation angles.

Figure 8:
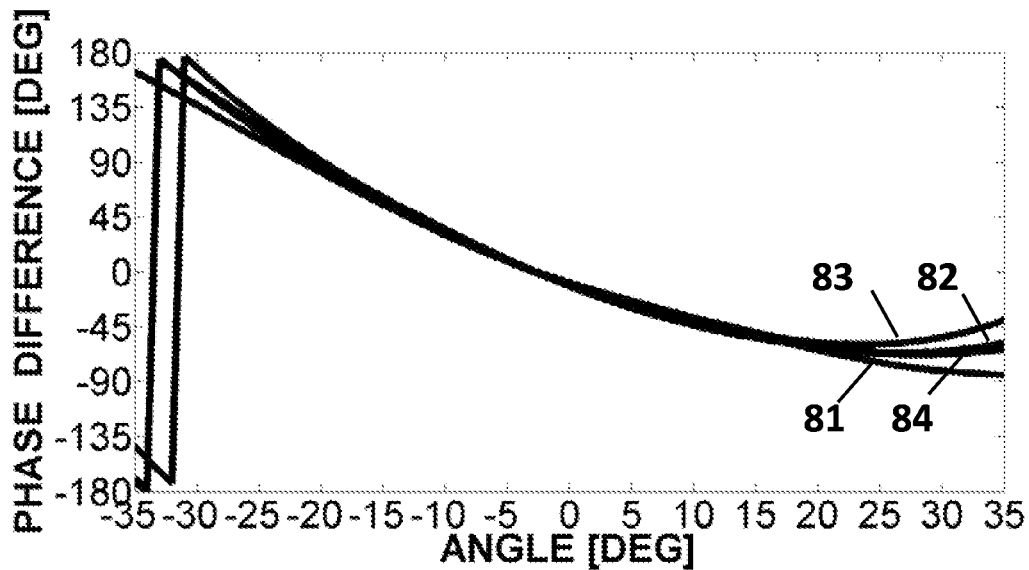
FIG. 8 illustrates examples of the dependencies of the phase difference signals versus the azimuth angle of an object for the received signals between the the fifth antenna and a virtual virtual antenna.
Figure 9:
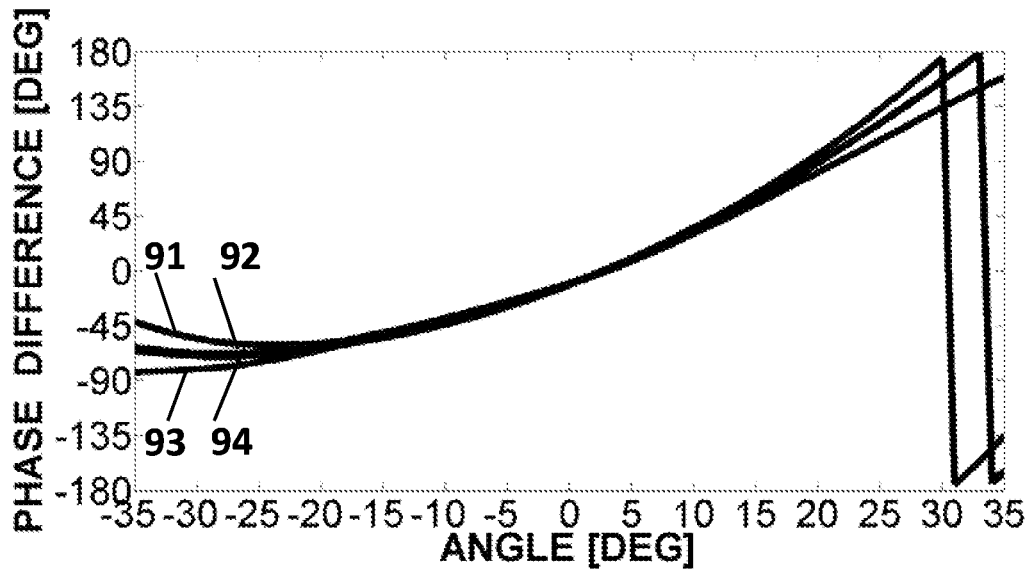
FIG. 9 illustrates examples of the dependencies of the phase difference signals versus the elevation angle of an object for the received signals between the the fifth antenna and a virtual virtual antenna.

Turning now to FIGS. 1, 7, 8 and 9 together. FIGS. 8 and 9 illustrate examples of dependencies of phase difference signals versus the azimuth angle and the elevation angle of an object, correspondingly, for received signals between the the fifth antenna 71 and the virtual virtual antennas 161 and 162 formed in quadrants A and B, correspondingly. The signals have linear polarizations of 0 degree (curves 81, 91), 45 degrees (curve 82, 92), 90 degrees (curve 83, 93) and 135 degrees (curve 84, 94), correspondingly, when separation between the real linearly polarized antennas 111, 112 and 121, 122 of the first pair and second pair was set to 1.25λ. The phase differences obtained for the fifth antenna 71 and the virtual virtual antenna 162 can be compared to the phase differences obtained for the virtual antennas 162 and 164 formed in quadrants B and D for resolving ambiguity in determination of ambiguous azimuth. Likewise, phase differences obtained for fifth antenna 71 and the virtual antennas 161 can be compared to the phase differences obtained for the virtual antennas 161 and 164 formed in quadrants A and D for resolving ambiguity in determination of ambiguous elevation angles.

Turning back to FIG. 1, according to another embodiment of the present invention, in order to track a signal emitting object (i.e., a target) with the radar system (10 in FIG. 1), use is made of the monopulse principle. In accordance with this embodiment, in order to implement the monopulse principle for calculation of direction target parameters, signals associated with the four virtual antennas 161, 162, 163 and 164 formed with phase centers in the four quadrant parts A, B, D and C, correspondingly, are used.

The processing includes summing the received signals $S_A$, $S_B$, $S_C$ and $S_D$ associated with the four virtual antennas 161, 162, 163 and 164, correspondingly, to calculate a four antennas sum signal $\Sigma$, obtained by $$\Sigma = S_A + S_B + S_C + S_D, \quad (3)$$

In accordance with the monopulse method, an azimuth difference signal $\Delta az$ is formed by subtracting the received signals associated with the "right" quadrant parts (i.e., quadrant parts B and D in FIG. 1) from the received signals associated with the "left" quadrant parts (quadrant parts A and C in FIG. 1), and obtained by $$\Delta az = (S_A + S_C) - (S_B + S_D) \quad (4)$$

The azimuth difference signals for each type of polarization can be processed to calculate object's position to the left or right relative to the vehicle platform, since the azimuth angle of the object is proportional to monopulse ratio $\Delta az/\Sigma$.

An elevation difference signal $\Delta el$ is formed by subtracting the received signals $S_C$ and $S_D$ associated with the two neighboring virtual antennas of the "lower" quadrant parts (i.e., quadrant parts C and D in FIG. 1) from the received signals $S_C$ and $S_D$ associated with the two neighboring virtual antennas of the two "upper" quadrants (i.e., quadrant parts A and B in FIG. 1), and obtained by $$\Delta el = (S_A + S_B) - (S_C + S_D). \quad (4)$$

The elevation difference signal $\Delta el$ can be processed for calculation of an object's elevation relative to the vehicle platform, since the elevation angle of the object is proportional to monopulse ratio $\Delta el/\Sigma$.

Figure 10:
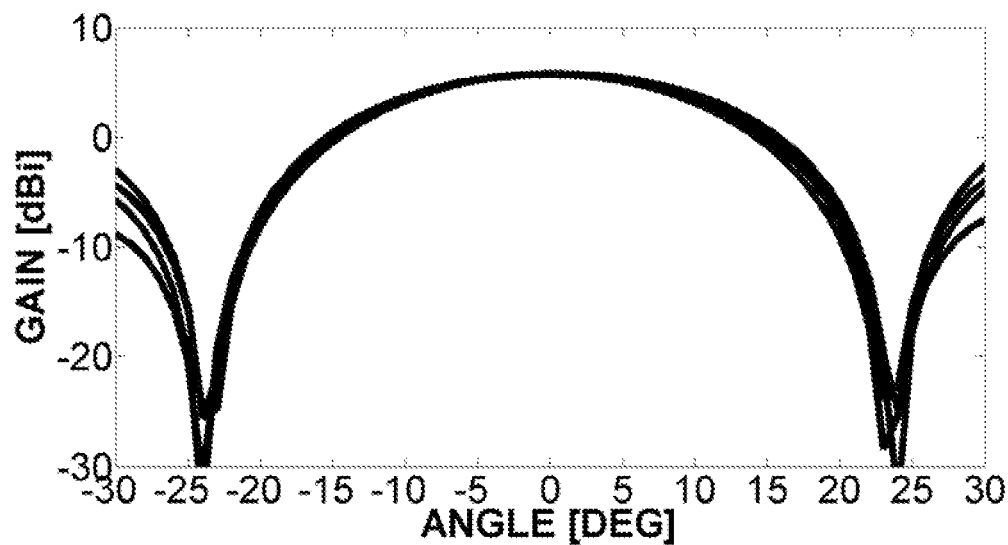
FIG. 10 illustrates examples of the results of simulations of the sum signal pattern versus azimuth angle of an object for the signals having various linear polarizations.
Figure 11:
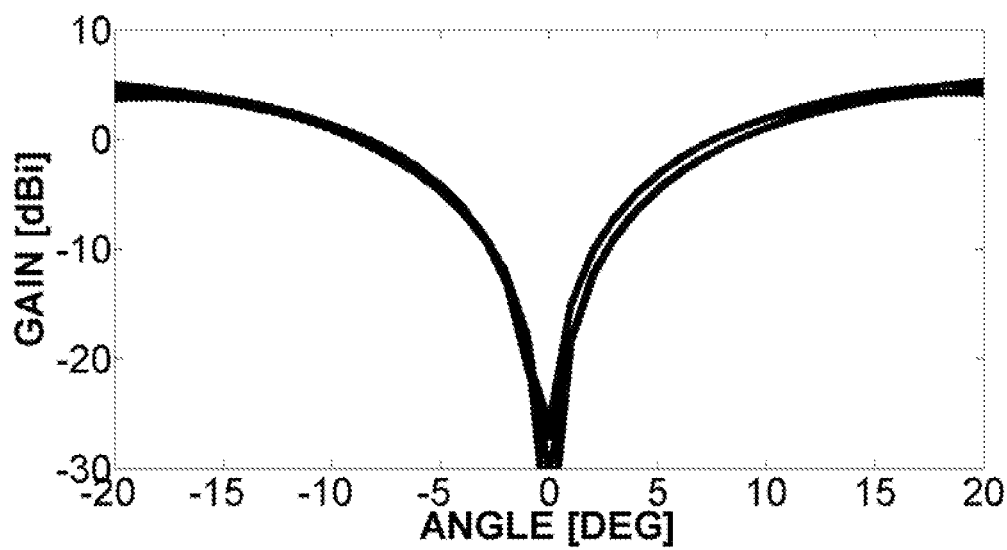
FIG. 11 illustrates examples of the results of simulations of the azimuth difference signal pattern versus azimuth angle of an object for the signals having various linear polarizations.

FIGS. 10 and 11 illustrate examples of results of simulations of the sum signal pattern and the azimuth difference signal pattern versus azimuth angle of an object for signals having linear polarizations of 0, 45, 90 and 135 degrees. These simulations were carried out for the boresight angle of 0 degrees and when the separations between the real linearly polarized antennas 111, 112 and 121, 122 of the first pair and second pair were set to 1.25λ.

Figure 12:
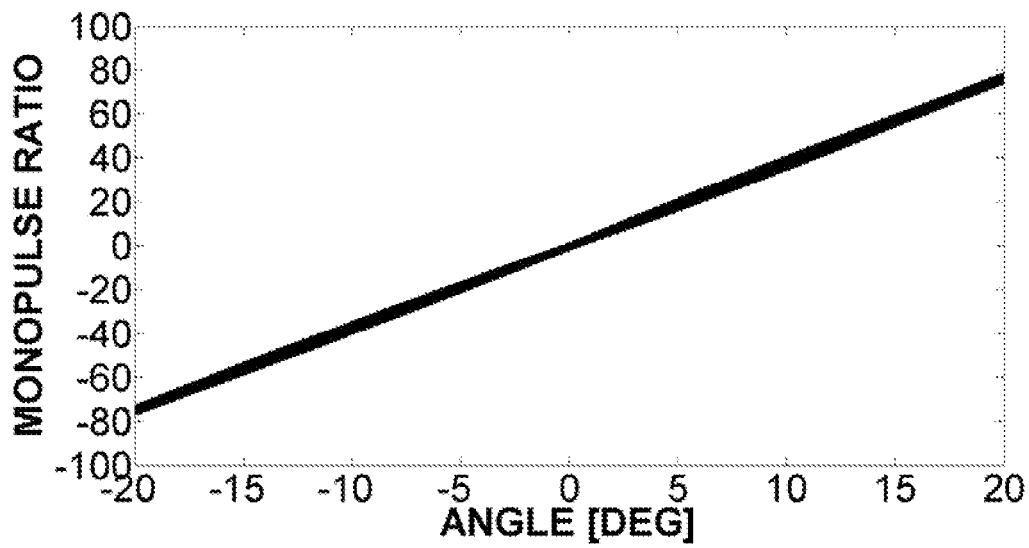
FIG. 12 illustrates dependencies of a monopulse ratio versus elevation angle of an object obtained for the signals having various linear polarizations.

The values of the sum signals and azimuth difference signals can be used for calculation of the azimuth angle of an object. FIG. 12 illustrates dependencies of the monopulse ratio versus azimuth angle obtained for signals having linear polarizations of 0, 45, 90 and 135 degrees. As can be seen from FIG. 12, the monopulse ratio does not depend significantly on polarization of the signal and can be used for accurate measurements of the azimuth angle of the object.

Figure 13:
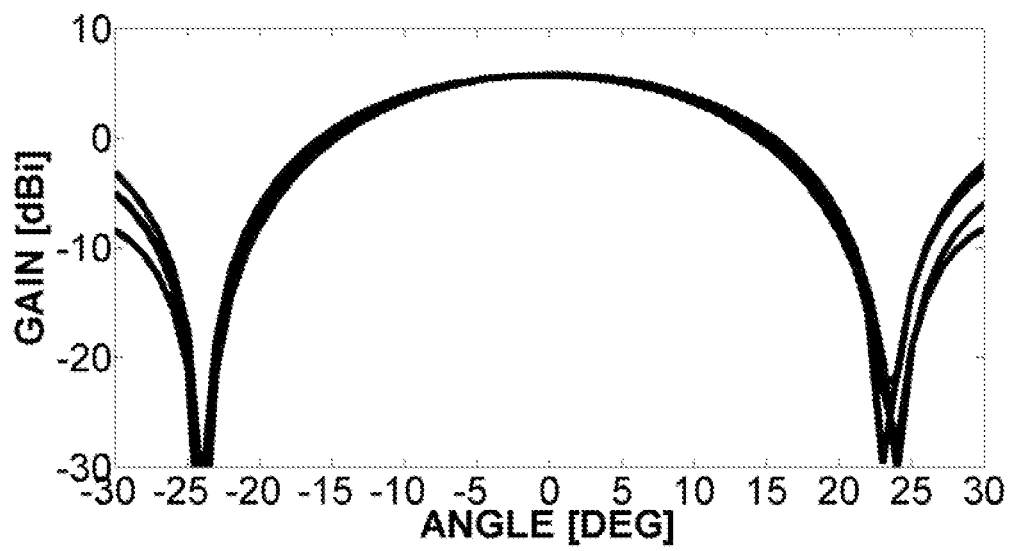
FIG. 13 illustrates examples of the results of simulations of the sum signal pattern versus elevation angle of an object for the signals having various linear polarizations.
Figure 14:
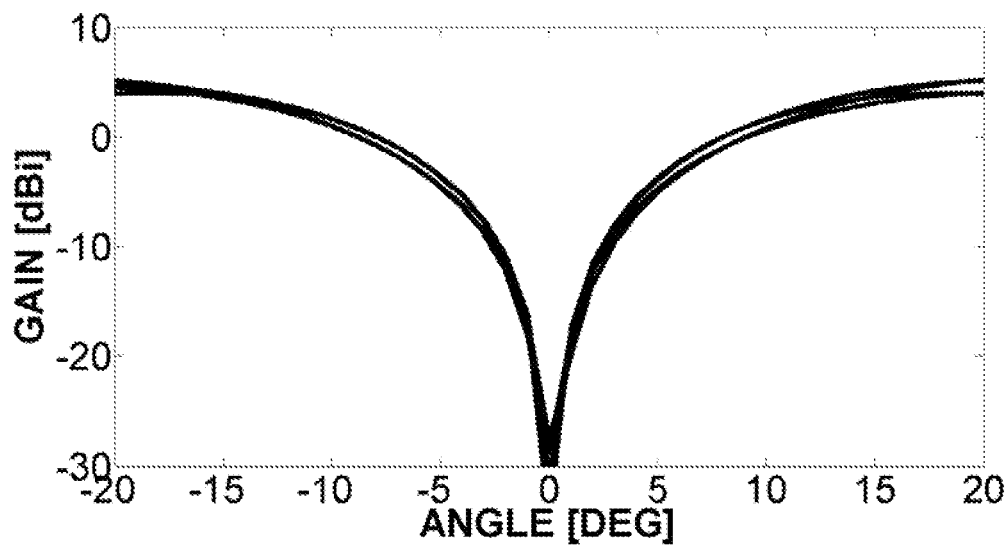
FIG. 14 illustrates examples of the results of simulations of the elevation difference signal pattern versus elevation angle of an object for the signals having various linear polarizations.

FIGS. 13 and 14 illustrate examples of results of simulations of the sum signal pattern and the elevation difference signal pattern versus elevation angle of an object for signals having linear polarizations of 0, 45, 90 and 135 degrees, The simulations were carried out for the boresight angle of 0 degrees and when the separations between the real linearly polarized antennas 111, 112 and 121, 122 of the first pair and second pair were set to 1.25λ.

Figure 15:
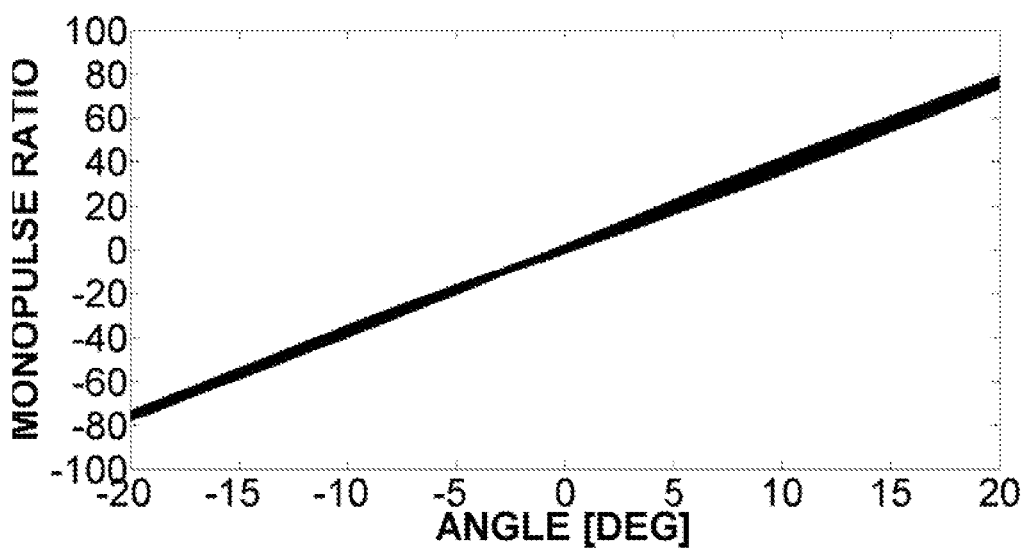
FIG. 15 illustrates dependencies of a monopulse ratio versus elevation angle of an object obtained for the signals having various linear polarizations.

The values of the sum signals and elevation difference signals can be used for calculation of the elevation angle of an object. FIG. 15 illustrates dependencies of the monopulse ratio versus elevation angle obtained for signals having linear polarizations of 0, 45, 90 and 135 degrees. As can be seen from FIG. 15, the monopulse ratio does not depend significantly on the polarization of the signal and can be used for accurate measurements of the elevation angle of the object.

Figure 16:
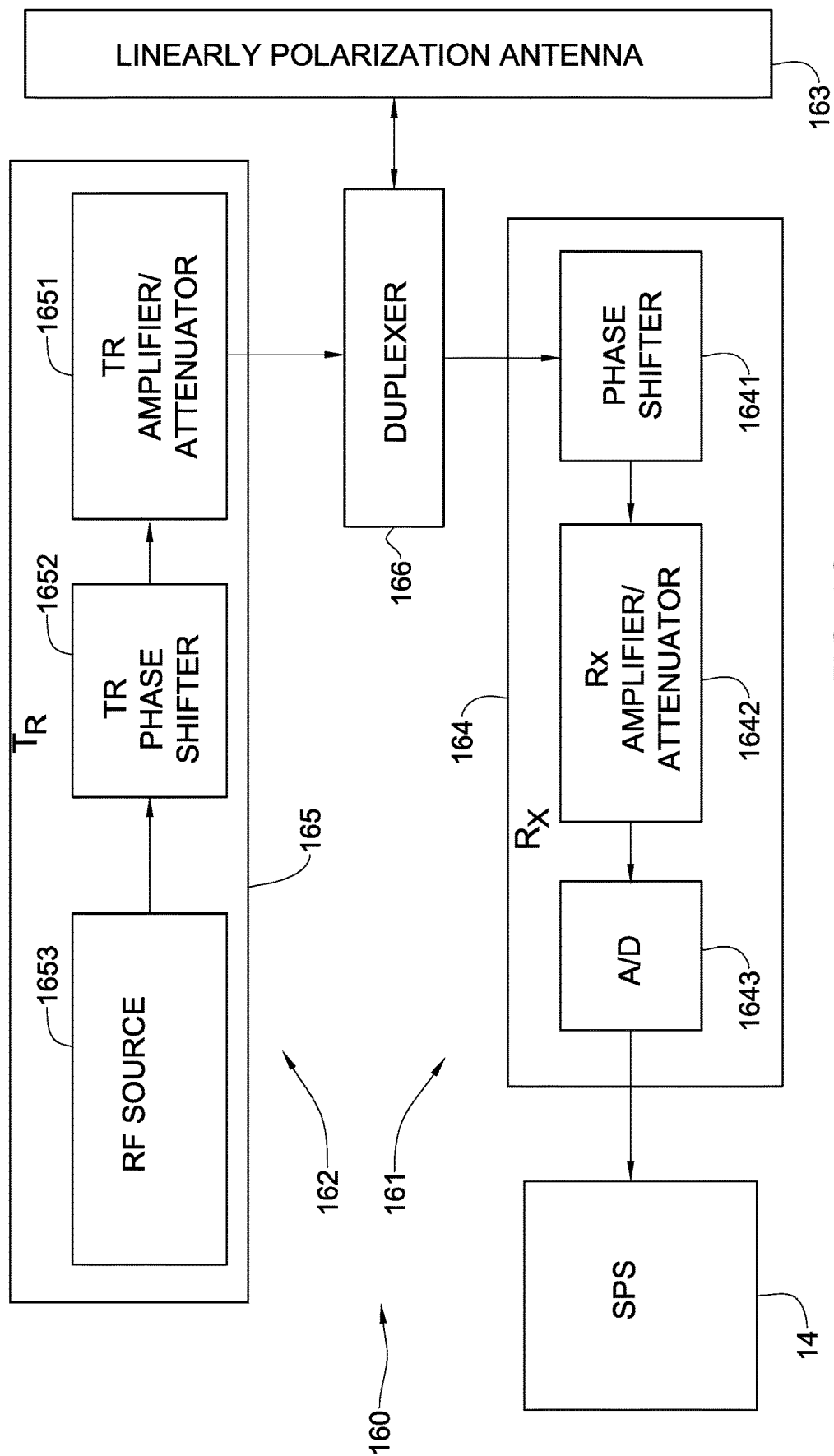
FIG. 16 illustrates one transmitting and one receiving channel of a radar system for determination of a direction to an object, according to an embodiment of the present invention.

According to an embodiment of the present invention, the radar system. further includes four transmitters coupled to the linearly polarized antennas of the first and second pairs of the radar system 10 shown in FIG. 1, correspondingly. FIG. 16 illustrates a portion 160 of such a radar system for determination of a direction to a target object (not shown), according to an embodiment of the present invention. The portion 160 includes one receiving channel 161 and one transmitting channel 162 coupled to a linearly polarized antenna 163. As noted above, the entire active radar system of this embodiment can include four receiving channels 161 and four transmitting channels 162 coupled to the corresponding linearly polarized antennas.

The receiving channel 161 includes a receiver (Rx) 164 that includes a phase shifter 1641, a receiver amplifier/attenuator 1642 and an analog-to-digital converter (ADC) 1743. The receiving channel 161 also includes a signal processing system (SPS) 14 arranged downstream of the receiving channel 161. Operation of the four receiving channels of the radar system is described hereinabove with reference to FIG. 1.

In turn, the transmitting channel 162 includes a transmitter ($T_R$) 165 that includes a source 1653 of radio frequency (RF) radiation and a $T_R$ phase shifter 1652 configured to provide required phase shifts to the signals provided by the RF source 1653. In operation, the $T_R$ phase shifter 1652 is configured to generate corresponding phase-shifted signals for transmitting towards the target object for illumination thereof. Moreover, the transmitter 164 includes a $T_R$ amplifier/attenuator 1651 configured for tuning power of the polarized signals transmitted on an aperture of the linearly polarized antenna 163.

According to an embodiment of the present invention, the portion 160 includes a duplexer 166 coupled to the receiver 164 and to the transmitter 165. The duplexer 166 isolates the receiving channel 161 from the transmitting channel 162, while permitting them to share the antenna 163 that is common for the receiving and transmitting channels. For example, the duplexer 166 can be implemented as a switch. Alternatively, the duplexer 166 can be implemented as a circulator.

It should be understood that by providing a suitable phase shift and amplitude to the signals transmitted on apertures of the linearly polarized antennas of the four transmitting channels, the entire transmitted signal produced by the radar system from the four linearly polarized antennas can have any desired polarization and power.

As such, those skilled in the art to which the present invention pertains, can appreciate that while the present invention has been described in terms of preferred embodiments, the concept upon which this disclosure is based may readily be utilized as a basis for the designing of other structures and processes for carrying out the several purposes of the present invention.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for determination of a direction to an object emitting and/or reflecting electromagnetic radiation, the system comprising:
    a first pair of linearly polarized antennas having a first type of polarization and separated by a first predetermined distance defining a first baseline, said first pair of linearly polarized antennas configured for receiving a polarized signal of the first type of polarization originated from the object;
    a second pair of linearly polarized antennas having a second type of polarization orthogonal to the polarization of the first pair and separated by a second predetermined distance defining a second baseline, said second pair of linearly polarized antennas configured for receiving another polarized signal of the second type of polarization originated from the object, the first baseline and the second baseline intersecting at right angles to define four quadrant parts;
    four receivers coupled to the linearly polarized antennas of the first and second pairs, wherein each of the four receivers is associated with at least one pair of the antennas includes a phase shifter configured to receive polarized signals, to provide a required phase shift to the received polarized signals, and to generate corresponding phase-shifted polarized signals; and
    a signal processing system coupled to said four receivers, and configured (a) to combine the phase-shifted polarized signals originated from said at least one pair of the antennas with non-shifted signals originated from another pair of the antennas, thereby forming four virtual antennas having a desired polarization with phase centers located in said four quadrant parts, correspondingly; and (b) to process the signals having the desired polarization associated with said four virtual antennas for generating at least one direction parameter of the object.

2. The system of claim 1, wherein said at least one direction parameter of the object is selected from at least one of an object elevation angle or an object azimuth angle.

3. The system of claim 1, wherein the first type of polarization and the second type of polarization are two perpendicular linear polarizations.

4. The system of claim 3, wherein said required phase shift to said received polarized signals is 90°.

5. The system of claim 3, wherein said desired polarization of the virtual antennas is a circular polarization.

6. The system of claim 1, wherein each of the four receivers includes an amplifier/attenuator configured for tuning power of the polarized signals received on apertures of at least one pair of the linearly polarized antennas.

7. The system of claim 1, wherein the signal processing system is configured for analog signal processing of the signals having the desired polarization associated with said four virtual antennas.

8. The system of claim 1, further comprising four analog-to-digital converters arranged upstream to the signal processing system configured for digital processing of the signals having the desired polarization associated with said four virtual antennas.

9. The system of claim 1, further comprising four transmitters coupled to the linearly polarized antennas of the first and second pairs and isolated from said four receivers by corresponding duplexers.

10. The system of claim 9, wherein each of the four transmitters includes a source of radio frequency radiation and a $T_R$ phase shifter configured to provide required phase shifts to the signals provided by the source of radio frequency radiation to generate corresponding phase-shifted signals for transmitting towards the object.

11. The system of claim 9, wherein each of the four transmitters includes a $T_R$ amplifier/attenuator configured for tuning power of the polarized signals transmitted on apertures of the linearly polarized antennas of the first and second pairs.

12. A method for determination of a direction to an object emitting and/or reflecting electromagnetic radiation, the method comprising:
providing a first pair of linearly polarized antennas having a first type of polarization and separated by a first predetermined distance defining a first baseline, said first pair of the linearly polarized antennas configured for receiving a polarized signal originated from the object;
providing a second pair of linearly polarized antennas having a second type of polarization orthogonal to the polarization of the first pair and separated by a second predetermined distance defining a second baseline, said second pair of linearly polarized antennas configured for receiving another polarized signal originated from the object, the first baseline and the second baseline intersecting at right angles to define four quadrant parts;
providing four receivers coupled to the linearly polarized antennas of the first and second pairs, wherein each receiver associated with at least one pair of the antennas includes a phase shifter configured to receive polarized signals, to provide a required phase shift to the received polarized signals, and to generate corresponding phase-shifted polarized signals;
receiving a polarized signal which originated from the object by said first pair of the linearly polarized antennas;
receiving another polarized signal which originated from the object by said second pair of linearly polarized antennas,
providing required phase shifts to the received polarized signal which originated from said at least one pair of the antennas selected from at least one of the first or second pairs, and generating corresponding phase-shifted polarized signals;
combining the phase-shifted polarized signals originated from said at least one pair of the antennas with non-shifted signals originated from another pair of the antennas, thereby forming four virtual antennas having a desired polarization with phase centers located in said four quadrant parts, correspondingly; and
processing the signals having the desired polarization associated with said four virtual antennas for generating at least one direction parameter of the object.

13. The method of claim 12, wherein the processing of the signals having the desired polarization for generating at least one direction parameter of the object comprises applying a monopulse tracking technique, includes:
summing signals received from said four virtual antennas formed in said four quadrant parts to calculate a four antennas sum signal ($\Sigma$);
summing received signals associated with any two neighboring virtual antennas selected from said four virtual antennas to calculate a first two antennas sum signal and summing received signals associated with two other neighboring virtual antennas to calculate a second two antennas sum signal;
generating a difference signal ($\Delta$) between said first two antennas sum signal and said second two antennas sum signal; and
processing said four antennas sum signal ($\Sigma$) and said difference signal ($\Delta$) for generating said at least one direction parameter of the object.

14. The method of claim 12, wherein the processing of the signals having the desired polarization for generating at least one direction parameter of the object comprises applying an interferometry technique, includes:
generating a phase difference signal between the received signals associated with a pair of virtual antennas formed in two quadrant parts selected from said four quadrants, said two quadrant parts being oppositely located with respect to an intersection point of the first baseline and the second baseline;
calculating a distance between phase centers of the virtual antennas formed in said two quadrant parts; and
processing said phase difference signal and the distance between the phase centers for generating said at least one parameter of the object.

15. The method of claim 12, further comprising tuning of a power of the polarized signals received on apertures of at least one pair of the linearly polarized antennas, thereby varying location of the phase centers of the virtual antennas within space of said four quadrant parts.

16. The method of claim 12, further comprising varying phases of the polarized signals received by at least one pair of the linearly polarized antenna to provide required phase shifts to the received polarized signals.

17. The method of claim 16, wherein said required phase shift to the received polarized signals is 90°.

18. The method of claim 12, wherein said two types of polarization are two perpendicular linear polarizations.

19. The method of claim 12, further comprising providing four transmitters coupled to the linearly polarized antennas of the first and second pairs and isolated from said four receivers by corresponding duplexers, wherein each transmitter includes a radio frequency radiation and a $T_R$ phase shifter configured to provide required phase shifts to the signals provided by the source of radio frequency radiation.

20. The method of claim 19, comprising:
generating radio frequency radiation;
providing required phase shifts to the signals provided by the source of radio frequency radiation;
generating corresponding phase-shifted signals; and
transmitting the phase-shifted signals towards the object.

* * * * *